(12) United States Patent
Suga

(10) Patent No.: US 6,820,891 B2
(45) Date of Patent: Nov. 23, 2004

(54) STROLLER FOLDABLE IN THREE

(75) Inventor: Nobuhide Suga, Saitama (JP)

(73) Assignee: Combi Corporation, Tokyo-to (JP)

( * ) Notice: Subject to any disclaimer, the term of this patent is extended or adjusted under 35 U.S.C. 154(b) by 0 days.

(21) Appl. No.: 10/228,920

(22) Filed: Aug. 28, 2002

(65) Prior Publication Data
US 2003/0042710 A1 Mar. 6, 2003

(30) Foreign Application Priority Data
Aug. 30, 2001 (JP) ........................................ 2001-261173

(51) Int. Cl.$^7$ ................................................ B62B 7/08
(52) U.S. Cl. ..................... 280/642; 280/47.38; 280/650
(58) Field of Search .............................. 280/39, 38, 42, 280/47.4, 47.36, 47.39, 47.25, 47.38, 639, 642, 647, 650, 657, 658; 297/42, 44, 350

(56) References Cited

U.S. PATENT DOCUMENTS

| | | | | |
|---|---|---|---|---|
| 4,191,397 A | * | 3/1980 | Kassai | 280/647 |
| 4,542,916 A | * | 9/1985 | Kassai | 280/642 |
| 4,660,850 A | * | 4/1987 | Nakao et al. | 280/642 |
| 5,752,738 A | * | 5/1998 | Onishi et al. | 297/61 |
| 5,769,448 A | | 6/1998 | Wang | |
| 5,871,227 A | * | 2/1999 | Huang | 280/642 |
| 6,322,098 B1 | * | 11/2001 | Lan | 280/642 |
| 6,422,587 B1 | * | 7/2002 | Yamazaki et al. | 280/642 |
| 6,431,579 B1 | * | 8/2002 | Kaneko et al. | 280/642 |
| 6,533,311 B2 | * | 3/2003 | Kaneko et al. | 280/647 |
| 6,561,536 B2 | * | 5/2003 | Suzuki | 280/642 |

FOREIGN PATENT DOCUMENTS

EP            1190930 A2      3/2002

* cited by examiner

Primary Examiner—Christopher P. Ellis
Assistant Examiner—Brian Swenson
(74) Attorney, Agent, or Firm—Wenderoth, Lind & Ponack, L.L.P.

(57) ABSTRACT

A stroller foldable in three includes a pair of front legs, a handle having two side parts, and first and second side connecting bars connecting the pair of front legs and lower end parts of the side parts of the handle. The first side connecting bar is provided with a hook, the second side connecting bar is provided with a loop with which the hook engages to retain the stroller in a folded state, in which the stroller is folded in three. An operating mechanism combined with the handle is interlocked with the hook by wires. The hook is disengaged from the loop by operating the operating mechanism.

14 Claims, 6 Drawing Sheets

STROLLER FOLDABLE IN THREE

BACKGROUND OF THE INVENTION

1. Field of the Invention

The present invention relates to a stroller foldable in three and, more particularly, to a stroller foldable in three having a folding body, and a retaining mechanism, for retaining the folding body in a folded state, capable of being easily disengaged.

2. Description of the Related Art

There have been proposed various folding strollers for carrying a baby outdoors for walking or shopping, capable of being folded in three and of being held in a folded state to facilitate storing and carrying.

Such a folding stroller has a folding body and a retaining mechanism. The folding body is folded in three and is retained in a folded state by the retaining mechanism. Although the retaining mechanism has a reliable strength and rigidity because the retaining mechanism is combined with the folding body, a user of the stroller needs to take his/her hands off a handle of the stroller to disengage the retaining mechanism because the retaining mechanism is spaced from the user's hands.

SUMMARY OF THE INVENTION

Accordingly, it is an object of the present invention to provide a stroller foldable in three that is capable of being unfolded by operating an operating mechanism disposed close at hand.

According to the present invention, a stroller foldable in three includes: a pair of front legs, a pair of rear legs, a handle having two side parts respectively connected to the pair of rear legs, and first and second side connecting bars connecting the pair of front legs and lower end parts of the side parts of the handle; wherein the first side connecting bar is provided with a hook, the second side connecting bar is provided with an engagement device with which the hook engages, an operating mechanism is combined with the handle, the operating mechanism is interlocked with the hook, and the hook can be disengaged from the engagement device by operating the operating mechanism.

In the stroller foldable in three according to the present invention, a slider is mounted for axial movement on a lower end part of the side part of the handle on the side of the first side connecting bar, the operating mechanism and the slider are connected by a first wire, and the slider and the hook are connected by a second wire.

In the stroller foldable in three according to the present invention, a frame cover for guiding the second wire to the first side connecting bar is disposed between the first side connecting bar and a lower end part of the side part of the handle, and the second wire is extended along the first side connecting bar.

In the stroller foldable in three according to the present invention, a rocker ring for guiding the second wire to the hook is disposed near the hook.

In the stroller foldable in three according to the present invention, an upper connecting bar is extended between the first and the second side connecting bars, and the rocker ring is mounted on the upper connecting bar.

In the stroller foldable in three according to the present invention, the hook has a nose that engages with the engagement device, and the hook is supported pivotally on the first side connecting bar.

In the stroller foldable in three according to the present invention, the hook is urged in an engaging direction, to engage with the engagement device, by a spring.

In the stroller foldable in three according to the present invention, brackets and locking members are placed between the pair of rear legs and the handle, the slider is connected to the locking member on the side of one of the rear legs, and the locking member is disengaged from the corresponding brackets by moving the slider.

In the stroller foldable in three according to the present invention, the slider and the locking member are interlocked by a pin attached to the slider so as to extend perpendicularly to an axis of the side part of the handle.

In the stroller foldable in three according to the present invention, the side part of the handle is provided with an axial slot, and the pin moves along the slot.

DETAILED DESCRIPTION OF THE PREFERRED EMBODIMENTS

A stroller foldable in three, in a preferred embodiment according to the present invention, will be described with reference to FIGS. 1 to 5.

Figure 1:
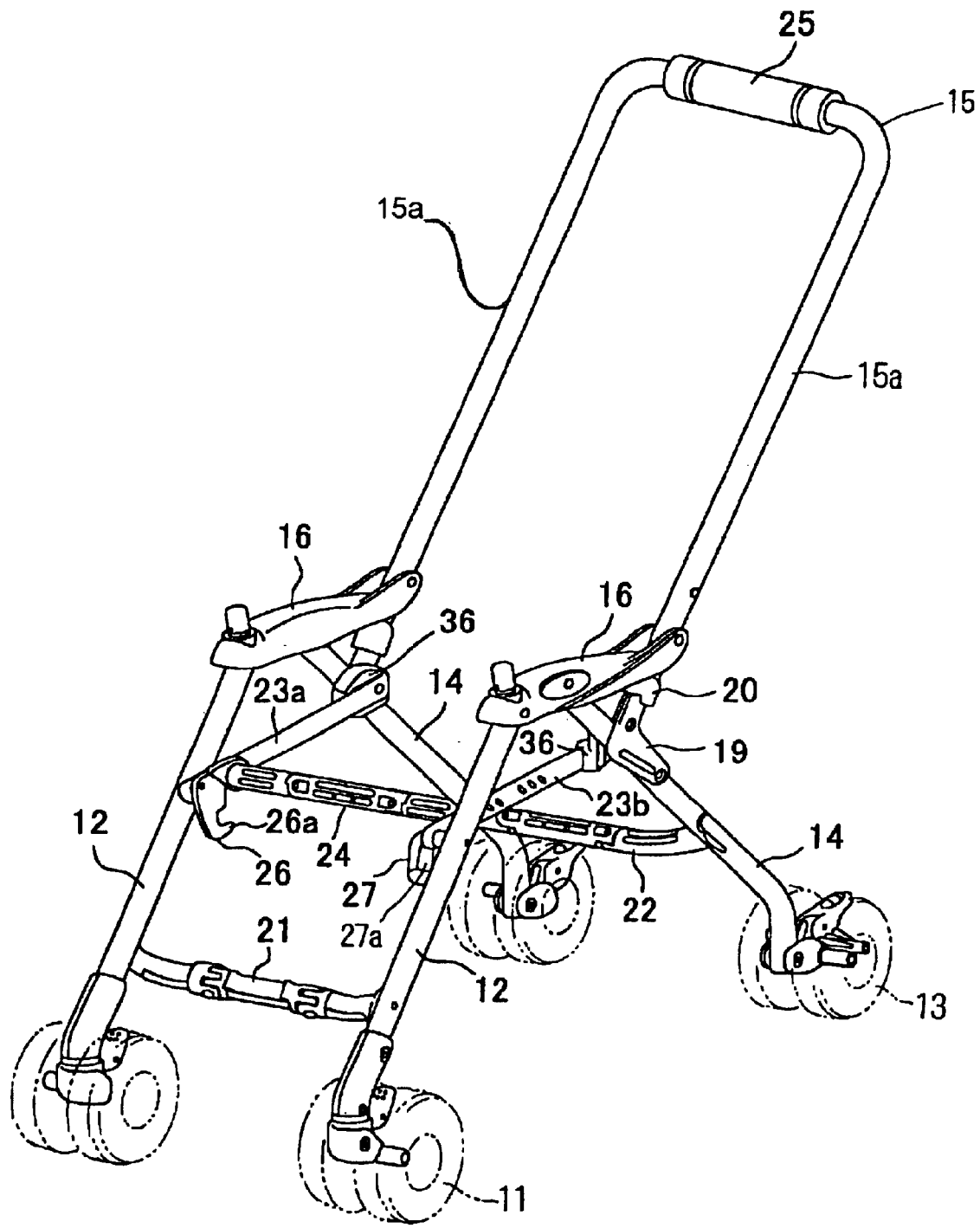
FIG. 1 is a schematic perspective view of a stroller foldable in three in a preferred embodiment according to the present invention.

Referring to FIG. 1, showing the stroller foldable in three in the preferred embodiment in a perspective view, the stroller has two front legs (right and left front legs) 12 provided with front wheels 11, two rear legs (right and left rear legs) 14 provided with rear wheels 13, a substantially U-shaped handle 15, two armrests (right and left armrests) 16, and a detachable guard arm 17 (FIG. 6) extended between the armrests 16. The handle 15 has right and left side parts 15a, 15a. Rear ends of the armrests 16 are pivotally joined to parts near lower ends of the right and the left side parts 15a, 15a of the handle 15, respectively. Upper end parts of the front legs 12 are pivotally joined to front end parts of the armrests 16, respectively. Upper end parts of the rear legs 14 are pivotally joined to middle parts of the armrests 16, respectively. Lower ends of L-shaped brackets 19 are pivotally joined to middle parts of the rear legs 14, respectively. Lower ends of the side parts 15a, 15a of the handle 15 are pivotally joined to middle parts of the brackets 19, respectively. When the stroller is unfolded, locking members 20 slidably mounted on lower end parts of the side parts 15a, 15a of the handle 15 engage with locking parts formed in upper ends of the brackets 19, respectively, to retain the stroller in an unfolded state.

The right and the left front legs 12 are connected by a front connecting bar 21, and the right and the left rear legs 14 are connected by a rear connecting bar 22. Front ends of side connecting bars (first and second connecting bars) 23a and 23b are pivotally joined to middle parts of the front legs 12, respectively, and rear ends of the side connecting bars 23a and 23b are pivotally joined, together with the brackets 19, to lower end parts of the side parts 15a, 15a of the handle 15, respectively. Middle parts of the side connecting bars 23a and 23b are connected by an upper connecting bar 24. A combination of the front legs 12, rear legs 14, handle 15, first side connecting bar 23a and second side connecting bar 23b define a frame of the stroller.

The locking members 20 provided on the lower end parts of the side parts 15a, 15a of the handle 15 are engaged with upper locking parts of the brackets 19 to retain the stroller in the unfolded state for use. An operating mechanism 25 combined with the handle 15 is operated to disengage the locking members 20 from the brackets 19. When the locking members 20 are disengaged from the brackets 19, the armrests 16 and the side connecting bars 23a and 23b are allowed to turn upwardly on pivotal joints on the side parts 15a, 15a of the handle 15, so that the front legs 12 and the rear legs 14 can be folded so as to extend substantially parallel to each other to facilitate carrying the stroller.

Figure 7:
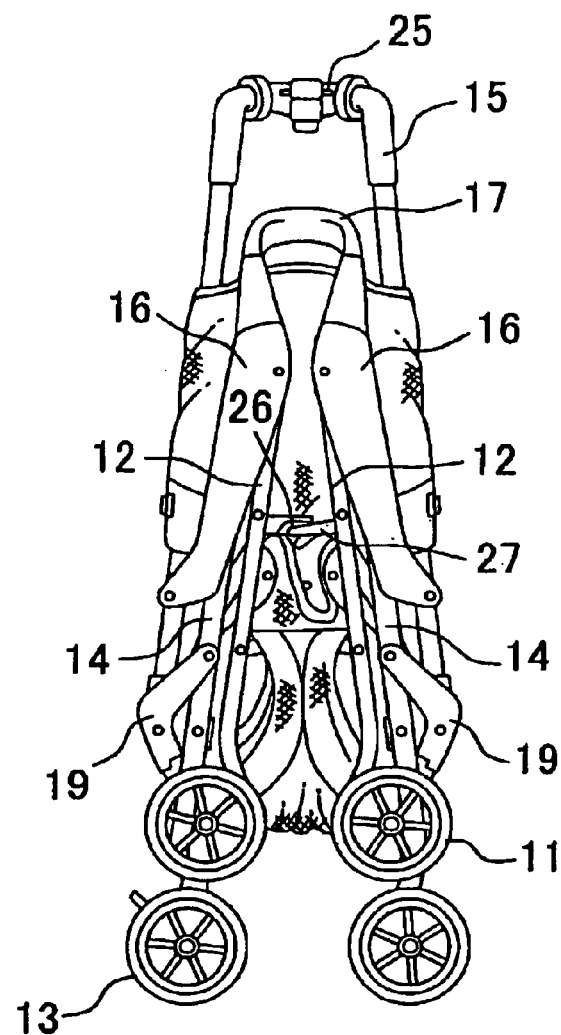
FIG. 7 is the stroller shown in FIG. 6 folded in three.

The handle 15, the front connecting bar 21, the rear connecting bar 22 and upper connecting bar 24 have middle parts, each provided with two joints at its opposite ends, and the joints at the opposite ends of the middle parts are included in two vertical planes, respectively. Thus, the handle 15, the front connecting bar 21, the rear connecting bar 22 and the upper connecting bar 24 are foldable. When the side parts 15a, 15a of the handle 15 are moved forwardly after folding the front legs 12 and the rear legs 14 so as to extend substantially parallel, respective end parts of the handle 15, the front connecting bar 21, the rear connecting bar 22 and the upper connecting bar 24 are bent forwardly. Consequently, the stroller can be compactly folded in three as shown in FIG. 7.

Figure 2:
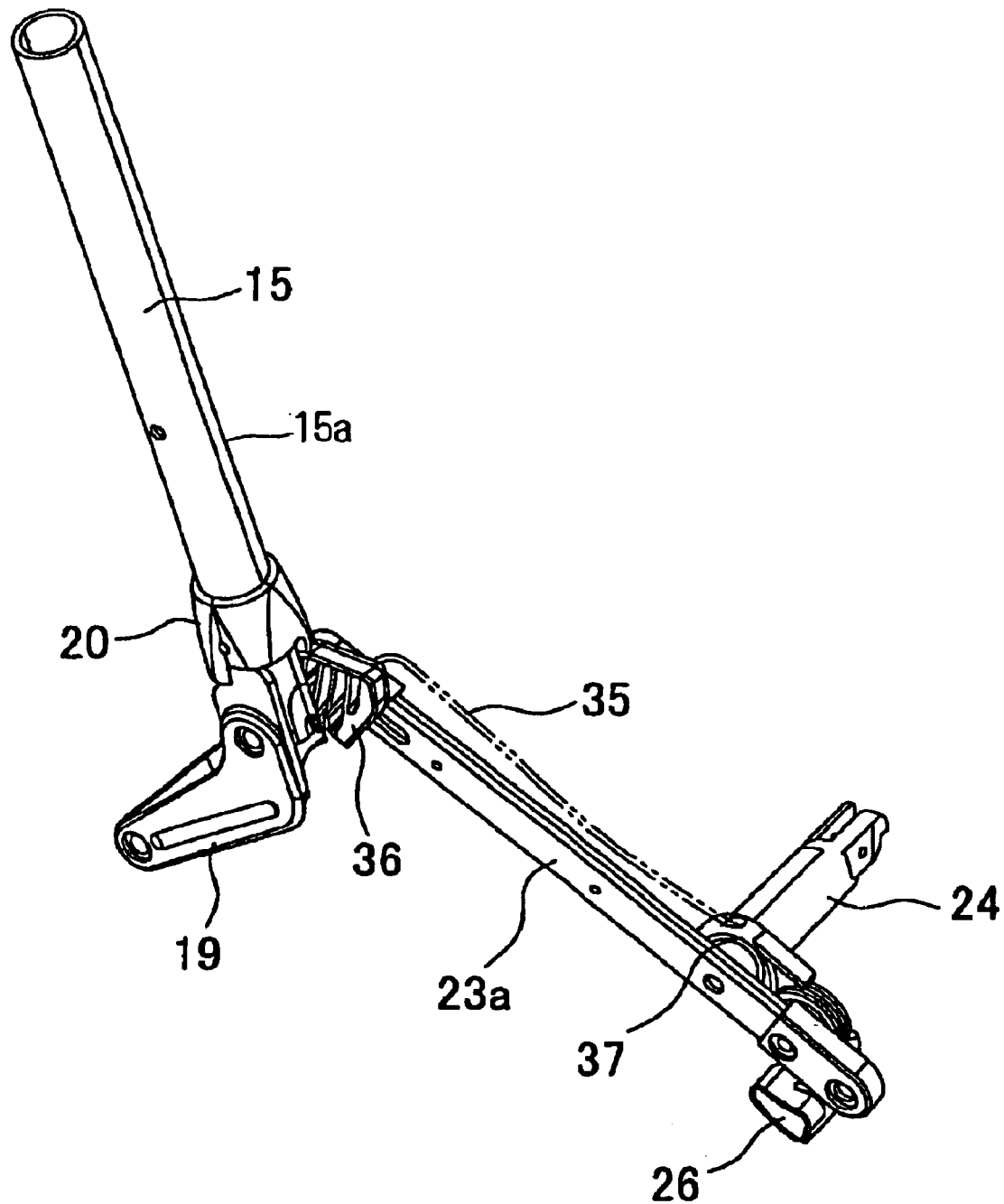
FIG. 2 is a fragmentary perspective view of a handle and a side connecting bar.
Figure 3:
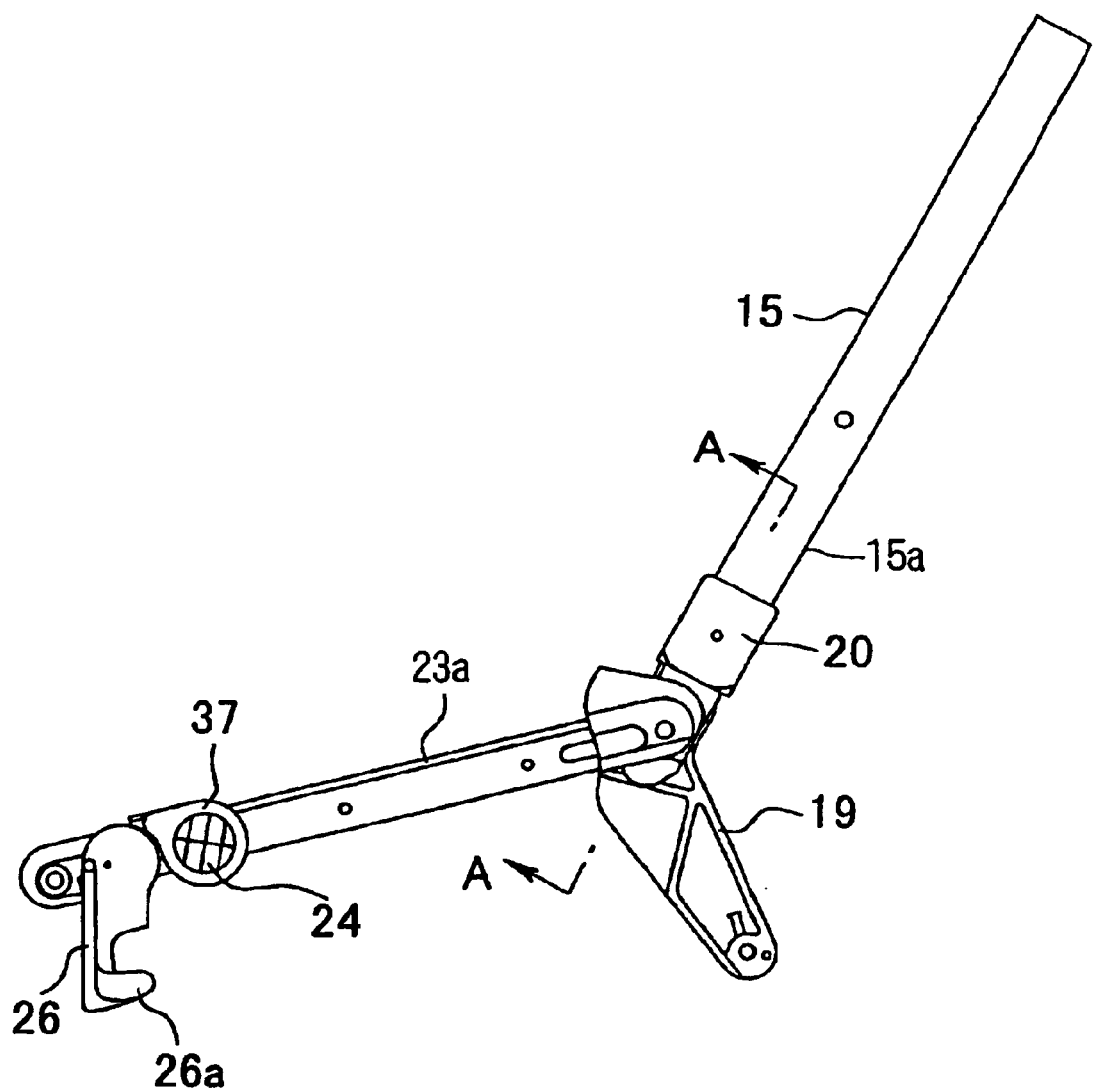
FIG. 3 is a side elevational view of the handle and the side connecting bar.

FIG. 2 is a perspective view of the right side part 15a, namely, the side part on the left side as viewed in FIG. 1, of the handle 15, and the first side connecting bar 23a, namely, the side connecting bar on the left side as viewed in FIG. 1, and FIG. 3 is a side elevational view of those components shown in FIG. 2. A rear end of the first side connecting bar 23a is pivotally joined, together with L-shaped bracket 19, to the lower end part of the right side part 15a of the handle 15. A hook 26 is pivotally supported on a front end part of the first side connecting bar 23a.

Figure 4:
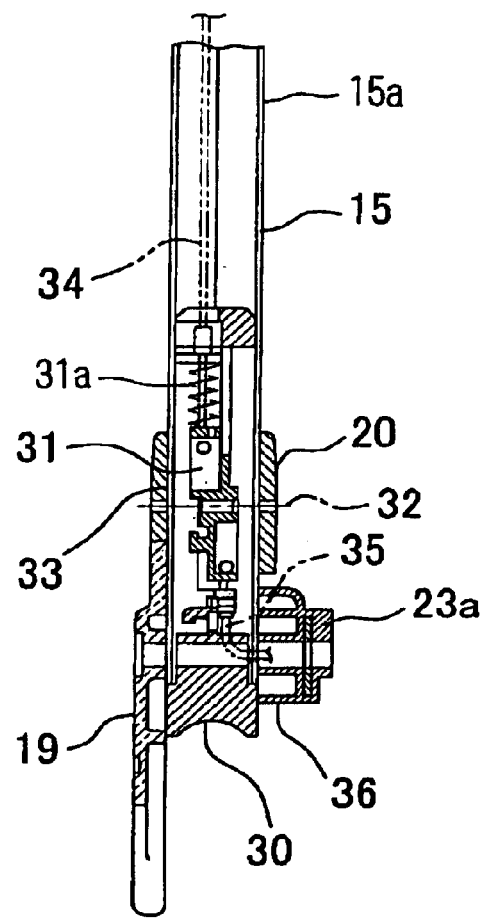
FIG. 4 is a sectional view taken along line A—A in FIG. 3.

FIG. 4 is a sectional view taken along line A—A in FIG. 3. Frame stoppers 30 are fitted into lower ends of the side parts 15a, 15a of the handle 15. A slider 31 is supported on the frame stopper 30 for sliding along an axis of side part 15a of the handle 15. A pin 32 projects from the slider 31 in a direction perpendicular to the axis of the side part 15a of the handle 15 so as to engage in an axial slot 33 formed in the side part 15a of the handle 15. The pin 32 is connected to the locking member 20 mounted on the side part 15a of the handle 15. The slider 31 is connected to the operating mechanism by a first wire 34 extended through the side part 15a of the handle 15, and is pushed toward the lower end of the side part 15a of the handle 15 by a spring 31a.

When the operating mechanism 25 is operated to pull up the first wire 34, the slider 31 is raised against resilience of the spring 31a, and the pin 32 moves the locking member 20 upwardly. Consequently, the locking member 20 is disengaged from the bracket 19, so that the stroller can be folded.

One end of a second wire 35 is connected to the slider 31, which is located in a lower end part of one of the side parts 15a, 15a of the handle 15. The second wire 35 is extended along the first side connecting bar 23a, and another end of the second wire 35 is connected to the hook 26. A frame cover 36 is put on a rear end of the first side connecting bar 23a and is pivotally joined to the side part 15a of the handle 15 together with the first side connecting bar 23a. The frame cover 36 guides the second wire 35 extending outside from the side part 15a of the handle 15 so as to extend along the first side connecting bar 23a.

Figure 5:
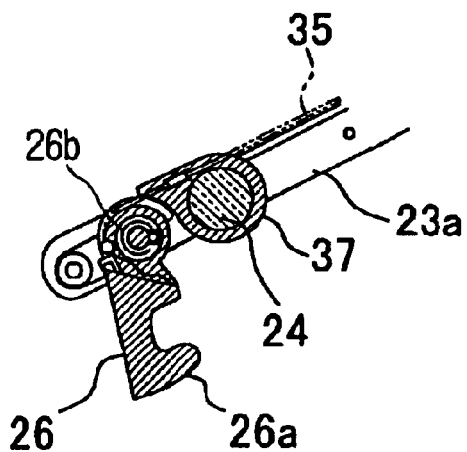
FIG. 5 is a sectional view of a hook.

As shown in FIGS. 2 and 5, a rocker ring 37 is mounted on the upper connecting bar 24 contiguously with the first side connecting bar 23a. The rocker ring 37 guides the second wire 35. A free end of the second wire 35 is connected to a peripheral part of a base part of the hook 26. The base part of the hook 26 is pivotally joined to an inner side wall of the first side connecting bar 23a. The hook 26 has a nose 26a and is urged counterclockwise, as viewed in FIG. 5, by a spring 26b.

When the operating mechanism 25 is operated to pull up the first wire 34, the slider 31 is raised, the second wire 35 is pulled, and the hook 26 is turned in a disengaging direction, i.e., in a clockwise direction, as viewed in FIG. 5, against resilience of the spring 26b.

A loop (engagement device) 27 having an eye 27a in which the nose 26a of the hook 26 is able to engage, is attached to a front end part of the second side connecting bar 23b.

When the stroller is folded in three, the hook 26 and the loop 27 are positioned to face each other, and the nose 26a of the hook 26 engages in the eye 27a of the loop 27 to retain the stroller in a folded state.

When it is desired to unfold the stroller, the operating mechanism 25 is operated to pull up the first wire 34. Then, the slider 31 is raised, the locking member 20 is raised accordingly, and the locking member 20 is disengaged from the bracket 19. Meanwhile, the second wire 35 is pulled by the slider 31, the hook 26 is turned in a disengaging direction against resilience of the spring 26b, and the stroller is released from being folded. Consequently, the stroller can be unfolded for use by operating the operating mechanism disposed close at hand.

As is apparent from the foregoing description, in the stroller according to the present invention, the operating mechanism combined with the handle, and the hook are connected by the first wire, and the hook is operated by operating the operating mechanism. Therefore, a retaining mechanism including the hook and the loop for retaining the stroller in a folded state is placed on parts that are excellent in strength and rigidity, and the retaining mechanism can be disengaged by operating the operating mechanism disposed close at hand to unfold the stroller.

Figure 6:
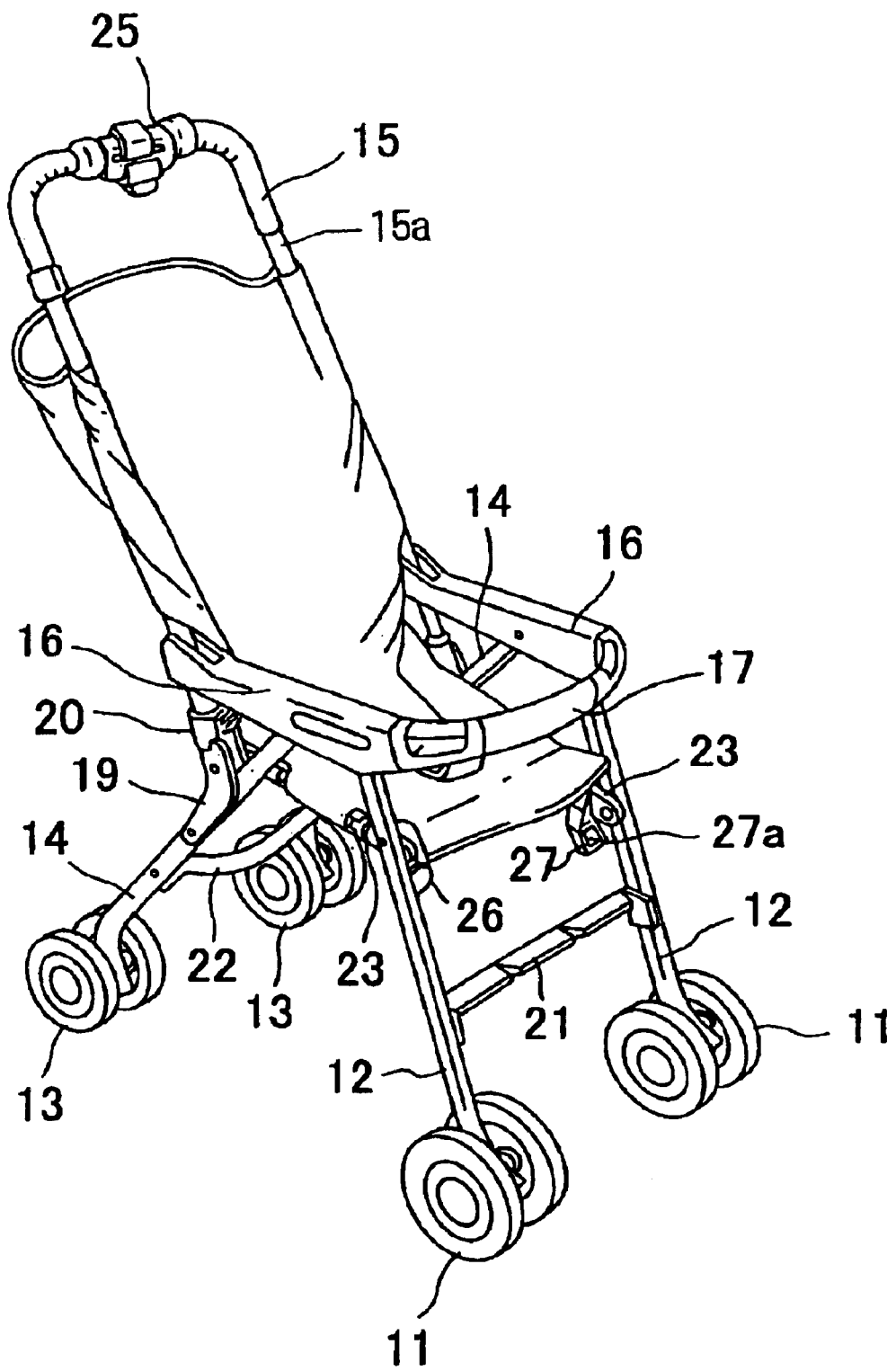
FIG. 6 is a perspective view of a stroller of a comparative example.

A folding stroller of a comparative example will be described with reference to FIGS. 6 to 8. Referring to FIG. 6 showing the folding stroller of the comparative example in a perspective view, the stroller has two front legs (right and left front legs) 12 provided with front wheels 11, two rear legs (right and left rear legs) 14 provided with rear wheels 13, a substantially U-shaped handle 15, two armrests (right and left armrests) 16, and a detachable guard arm 17 extended between the armrests 16. The handle 15 has right and left side parts 15a, 15a. Rear ends of the armrests 16 are pivotally joined to parts near lower ends of the right and the left side parts 15a, 15a of the handle 15, respectively. Upper end parts of the front legs 12 are pivotally joined to front end parts of the armrests 16, respectively. Upper end parts of the rear legs 14 are pivotally joined to middle parts of the armrests 16, respectively. Lower ends of L-shaped brackets 19 are pivotally joined to middle parts of the rear legs 14, respectively. Lower ends of the side parts 15a, 15a of the handle 15 are pivotally joined to middle parts of the brackets 19, respectively. When the stroller is unfolded, locking members 20, slidably mounted on lower end parts of the side parts 15a, 15a of the handle 15, engage with locking parts formed in upper ends of the brackets 19, respectively, to retain the stroller in an unfolded state.

The right and the left front legs 12 are connected by a front connecting bar 21, and the right and the left rear legs 14 are connected by a rear connecting bar 22. Front ends of side connecting bars 23 are pivotally joined to middle parts of the front legs 12, respectively, and rear ends of the side connecting bars 23 are pivotally joined together with the brackets 19 to lower end parts of the side parts 15a, 15a of the handle 15, respectively. Middle parts of the side connecting bars 23 are connected by an upper connecting bar.

As shown in FIG. 6, locking members 20, placed on the lower end parts of the side parts 15a, 15a of the handle 15, are engaged with upper locking parts of the brackets 19 to retain the stroller in the unfolded state for use. An operating mechanism 25 combined with the handle 15 is operated to disengage the locking members 20 from the brackets 19. Then, the armrests 16 and the side connecting bars 23 are allowed to turn upwardly on pivotal joints on the side parts 15a, 15a of the handle 15, so that the front legs 12 and the rear legs 14 can be folded so as to extend substantially parallel to each other to facilitate carrying the stroller.

The handle 15, the front connecting bar 21, the rear connecting bar 22 and an upper connecting bar (not shown) have middle parts each provided with two joints at its opposite ends, and the joints at the opposite ends of the middle parts are included in two vertical planes, respectively. Thus, the handle 15, the front connecting bar 21, the rear connecting bar 22 and the upper connecting bar are foldable. When the side parts 15a, 15a of the handle 15 are moved forwardly after folding the front legs 12 and the rear legs 14 so as to extend substantially parallel, respective end parts of the handle 15, the front connecting bar 21, the rear connecting bar 22 and the upper connecting bar are bent forwardly. Consequently, the stroller can be compactly folded in three as shown in FIG. 7.

A hook is connected to a front end part of one of the side connecting bars 23, and a loop (engagement device) 27 provided with an eye 27a, in which a nose 26a included in the hook 26 is able to engage, is connected to a front end part of the other side connecting bar 23.

Figure 8:
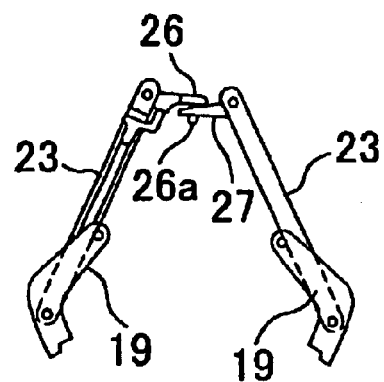
FIG. 8 is a view of assistance in explaining a retaining mechanism in a state where the stroller shown in FIG. 6 is folded in three.

The hook 26 is engaged with the loop 27 as shown in FIG. 8 after folding the stroller in three to retain the stroller in a folded state.

Whereas a user needs to take his/her hand off the handle 15 and needs to operate the hook by hand to engage or disengage the retaining mechanism of the stroller of the comparative example, a user is able to engage or disengage the retaining mechanism of the stroller of the present invention by operating the operating mechanism disposed close at hand.

What is claimed is:

1. A foldable stroller comprising:
    a frame including
        (i) two front legs,
        (ii) two rear legs,
        (iii) a handle having two side parts respectively connected to said two rear legs,
        (iv) a first side connecting bar,
        (v) a second side connecting bar, and
        (vi) an upper connecting bar extended between said first side connecting bar and said second side connecting bar.
        with said first and second side connecting bars connecting said two front legs to lower portions of said two side parts, respectively,
    a hook on said frame;
    a hook engagement device on said frame;
    an operating mechanism interlocked with said hook and combined with said handle;
    a slider mounted for axial movement on the lower portion of one of said two side parts that is connected to one of said two front legs via said first side connecting bar;
    a first wire connecting said operating mechanism to said slider;
    a second wire connecting said slider to said hook; and
    a rocker ring for guiding said second wire to said hook, said rocker ring being mounted near said hook on said upper connecting bar;
    wherein said operating mechanism is interlocked with said hook via said first and second wires such that upon activation of said operating mechanism, when said hook is engaged with said hook engagement device, said hook becomes disengaged from said hook engagement device.

2. The foldable stroller according to claim 1, further comprising:
    a frame cover for guiding said second wire to said first side connecting bar, said frame cover being between said first side connecting bar and said lower portion of said one of said two side pails that is connected to said one of said two front legs via said first side connecting bar,
    wherein said second wire extends along said first side connecting bar.

3. The foldable stroller according to claim 1, further comprising:
    a first bracket and first locking member between one of said two rear legs and said one of said two side parts;
    a second bracket and second locking member between the other of said two rear legs and the other of said two side parts,
    wherein said slider is connected to said first locking member such that upon moving said slider said first locking member is disengaged from said first bracket.

4. The foldable stroller according to claim 3, further comprising:
    a pin attached to said slider and extending perpendicularly to an axis of said one of said two side parts, said pin interlocking said slider and said first locking member.

5. The foldable stroller according to claim 4, further comprising:
    an axial slot in said one of said two side parts,
    wherein said pin is to travel along said axial slot.

6. The foldable stroller according to claim 1, wherein said hook has a nose that is to engage with said hook engagement device, and said hook is pivotally supported on said frame.

7. The foldable stroller according to claim 6, further comprising:
    a spring to urge said hook in an engaging direction such that said nose engages with said hook engagement device.

8. The foldable stroller according to claim 1, wherein
said hook is on said first side connecting bar, and
said hook engagement device is on said second side connecting bar.

9. The foldable stroller according to claim 8, further comprising:
a frame cover for guiding said second wire to said first side connecting bar, said frame cover being between said first side connecting bar and said lower portion of said one of said two side parts that is connected to said one of said two front legs via said first side connecting bar,
wherein said second wire extends along said first side connecting bar.

10. The foldable stroller according to claim 8, further comprising:
a first bracket and first locking member between one of said two rear legs and said one of said two side parts;
a second bracket and second locking member between the other of said two rear legs and the other of said two side parts,
wherein said slider is connected to said first locking member such that upon moving said slider said first locking member is disengaged from said first bracket.

11. The foldable stroller according to claim 10, further comprising:
a pin attached to said slider and extending perpendicularly to an axis of said one of said two side parts, said pin interlocking said slider and said first locking member.

12. The foldable stroller according to claim 11, further comprising:
an axial slot in said one of said two side parts,
wherein said pin is to travel along said axial slot.

13. The foldable stroller according to claim 8, wherein
said hook has a nose that is to engage with said hook engagement device, and
said hook is pivotally supported on said first side connecting bar.

14. The foldable stroller according to claim 13, further comprising:
a spring to urge said hook in an engaging direction such that said nose engages with said hook engagement device.

* * * * *